United States Patent
Miller et al.

(10) Patent No.: US 7,217,402 B1
(45) Date of Patent: May 15, 2007

(54) APPARATUS AND METHOD FOR MAKING METAL CHLORIDE SALT PRODUCT

(75) Inventors: William E. Miller, Naperville, IL (US); Zygmunt Tomczuk, Homer Glen, IL (US); Michael K. Richmann, Carlsbad, NM (US)

(73) Assignee: United States of America Department of Energy, Washington, DC (US)

( * ) Notice: Subject to any disclaimer, the term of this patent is extended or adjusted under 35 U.S.C. 154(b) by 0 days.

(21) Appl. No.: 11/217,844

(22) Filed: Aug. 26, 2005

(51) Int. Cl.
 *C01F 17/00* (2006.01)
 *C01B 9/02* (2006.01)

(52) U.S. Cl. .................. 423/249; 423/250; 423/251; 423/252; 423/257; 423/499.1; 423/499.3; 423/499.4; 423/497; 423/491

(58) Field of Classification Search ............ 423/2, 423/3, 491–499.4, 253, 254, 257, 249, 250–252
See application file for complete search history.

(56) References Cited

U.S. PATENT DOCUMENTS

| | | | | |
|---|---|---|---|---|
| 4,814,046 A | * | 3/1989 | Johnson et al. | 205/47 |
| 5,041,193 A | * | 8/1991 | Grantham | 205/43 |
| 5,356,605 A | * | 10/1994 | Tomczuk et al. | 423/251 |
| 6,800,262 B1 | * | 10/2004 | Miller et al. | 423/257 |

* cited by examiner

*Primary Examiner*—Ngoc-Yen Nguyen
(74) *Attorney, Agent, or Firm*—Bradley W. Smith; Mark P. Dvorscak; Paul A. Gottlieb

(57) ABSTRACT

A method of producing metal chlorides is disclosed in which chlorine gas is introduced into liquid Cd. $CdCl_2$ salt is floating on the liquid Cd and as more liquid $CdCl_2$ is formed it separates from the liquid Cd metal and dissolves in the salt. The salt with the $CdCl_2$ dissolved therein contacts a metal which reacts with $CdCl_2$ to form a metal chloride, forming a mixture of metal chloride and $CdCl_2$. After separation of bulk Cd from the salt, by gravitational means, the metal chloride is obtained by distillation which removes $CdCl_2$ and any Cd dissolved in the metal chloride.

12 Claims, 1 Drawing Sheet

APPARATUS AND METHOD FOR MAKING METAL CHLORIDE SALT PRODUCT

CONTRACTUAL ORIGIN OF THE INVENTION

The United States Government has rights in this invention pursuant to Contract No. W-31-109-ENG-38 between the U.S. Department of Energy (DOE) and The University of Chicago.

FIELD OF THE INVENTION

This invention is a method for making metal chlorides by combining $Cl_2$ with Cd to form $CdCl_2$ which forms a layer over a pool of liquid Cd and where the $CdCl_2$ reacts with the metal to form the desired metal chloride.

BACKGROUND OF THE INVENTION

There is an ongoing problem concerning the development of a method of producing large quantities of metal chloride in a manner which is not corrosive to the containment vessel. The use of gaseous HCl or $Cl_2$ as the chlorinating agent results in extensive levels of corrosion in ferrous metal containers and any associated ferrous components. To counter this, the use of non-corrosive reactants forms the basis for the present invention. It is known that $CdCl_2$ is not a corrosive chlorinating agent for ferrous metals and can be combined with various more active metals to form a corresponding chloride. If $CdCl_2$ is purchased in its commercial form and then purified, the metal process becomes too expensive and also creates Cd metal waste. Applicants developed an alternate method by combining gaseous chlorine with liquid cadmium to form pure $CdCl_2$ for use as a chlorinating agent in combination with various metals to produce the desired metal chloride while not creating a large Cd waste residue. This occurs since the Cd is continually recycled in the process.

Accordingly, it is an object of the present invention to provide a method and apparatus for the production of a metal chloride in volatile $CdCl_2$, using $Cl_2$ as the chloride source in a manner which does not result in corrosion of the containment vessel and associate manufacturing apparatus.

Another object of the invention is to provide a method and apparatus which produces metal chloride at a reasonable cost since corrosion is eliminated and $Cl_2$, not $CdCl_2$ is the primary chloride source.

Additional advantages, objects and novel features of the invention will become apparent to those skilled in the art upon examination of the following and by practice of the invention.

SUMMARY OF THE INVENTION

This invention involves a method and apparatus for producing metal chlorides which a free energy of formation more negative than $CdCl_2$ and which are less volatile than $CdCl_2$, To produce the $CdCl_2$, gaseous $Cl_2$ is introduced into liquid Cd which resides, due to density differences, under upper layer initially of molten of $CdCl_2$. Since $CdCl_2$ is insoluble in Cd and of lower density, the $CdCl_2$ produced by the Cl will rise through the liquid Cd into the upper layer and replenish the $CdCl_2$ which is consumed in forming the metal chloride. A porous basket containing the metal to be chlorinated is suspended in the upper $CdCl_2$ layer. The $CdCl_2$ reacts with the metal, which is added in a controlled manner, to form a metal chloride which is soluble to some degree in the upper molten layer. The Cd which is produced in forming the metal chloride sinks due to density differences and recombines with the Cd pool under the molten salt. To maintain the molten state of the Cd and the upper $CdCl_2$ layer, the temperature of the reactants is maintained at about 600° C. to about 700° C. during the chlorination process. After the reaction is complete, the upper layer consisting of the metal chloride, the $CdCl_2$ and small amounts of dissolved Cd metal is separated and removed from the immiscible Cd layer which is left in the chlorination vessel. The removed material is then subjected to a distillation process which separates the more volatile $CdCl_2$ and Cd from the less volatile product metal chloride. The $CdCl_2$ and Cd are recycled to the chlorination vessel.

BRIEF DESCRIPTION OF THE DRAWINGS

The present invention is illustrated in the accompanying drawing where.

DETAILED DESCRIPTION OF THE INVENTION

Figure 1:
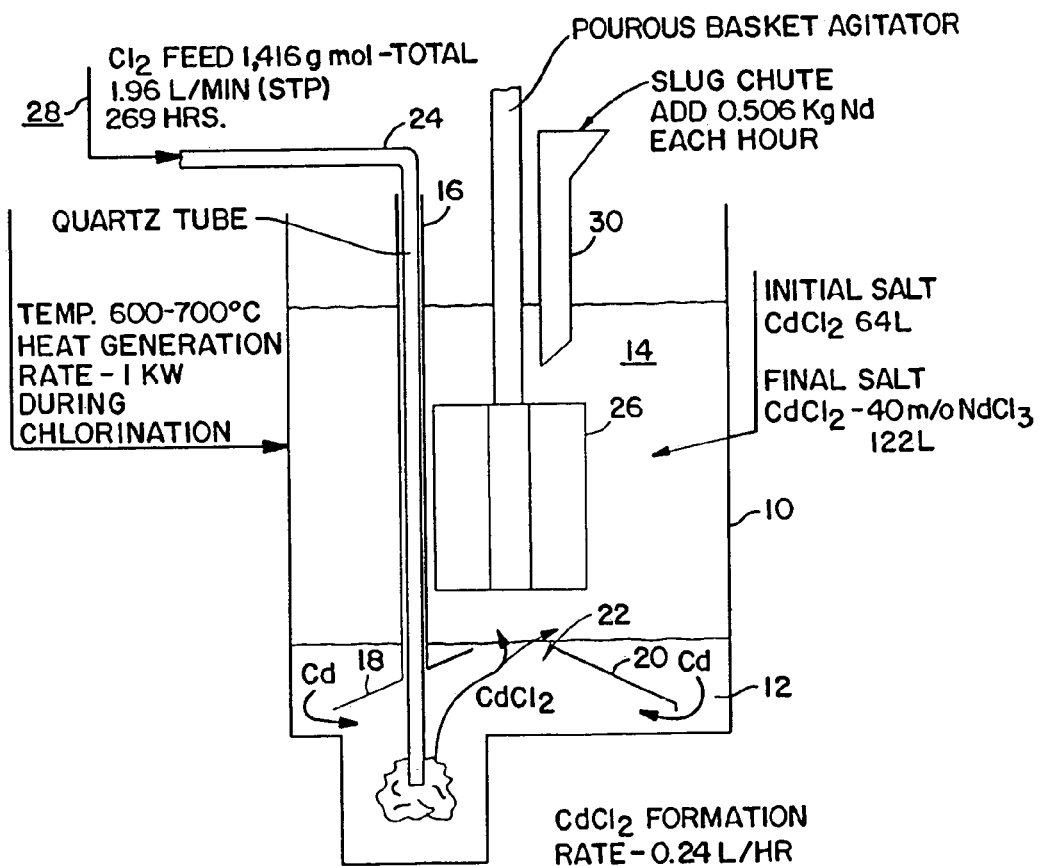
FIG. 1 is a diagram of the chlorinator apparatus for forming $NdCl_3$ one of the plurality of metal chlorides which can be manufactured.

FIG. 1 depicts a schematic of the apparatus for the chlorinator employed to formulate $NdCl_3$. As is shown in FIG. 1, the chlorination process is housed in a containment vessel 10. A layer of cadmium, Cd 12 is the base layer within the vessel 10. The upper layer 14 is initially $CdCl_2$ molten salt. The chlorinator is kept at an operational temperature of approximately 600° C.–700° C. which results in both layers being liquids but which is less than the boiling point of either Cd or $CdCl_2$. A hollow tube 16, preferably of a ferrous composition, penetrates the liquid salt 14 and terminates within the liquid Cd 12 while the opposing end remains above the surface of the liquid salt. In the preferred embodiment, the end of the tube 16 forms a baffle 18. A corresponding baffle 20 can be built into the container on the side opposing the tube 16. The baffles 18, 20 are arranged so that they slope upwardly to approximately the center of the vessel 10 and terminate so as to create a fixed opening 22 within the liquid Cd 12. A second hollow tube 24, preferably made of quartz, is threaded through the tube 16. The lead end of the second tube 24 extends past the end of the first tube such that it is further into the liquid Cd while the opposing end is connected to a $Cl_2$ feed 28. The second tube 24 is used to transport a stream of gaseous $Cl_2$ into the liquid Cd where it combines with the liquid Cd to form $CdCl_2$. The solubility of Cd in pure $CdCl_2$ at 600° C. is 15 mol %. This allows the material at the $Cl_2$ nozzle or orifice to have reactant Cd present; thus, the $CdCl_2$ pool which forms around the nozzle should never be inert. Since the density, at 600° C. of $CdCl_2$ is 3.37 while that of Cd is 7.82 and since the solubility of $CdCl_2$ in Cd is near zero, the $CdCl_2$ feeds into the overlying salt layer 14. The baffles 18 and 20 serve to direct the flow of the $CdCl_2$ towards the center of the containment vessel 10. A porous basket 26 containing the metal to be chlorinated in ingot form is submerged in the liquid salt 14. Because Cd has a $2^+$ valence, if the metal to be chlorinated has a $2^+$ valence, one mole of $CdCl_2$ will produce one mole of the chlorinated metal; similarly if the metal to be chlorinated has a $1^+$ valence, then one mole of $CdCl_2$ produces 2 moles of the chlorinated metal and if the metal to be chlorinated has a $3^+$ valence, then 3 moles of $CdCl_2$ produces 2 moles of the chlorinated metal.

The metal to be chlorinated may be an alkali, alkaline earth, rare earth, actinide or TRU metal with the chloride thereof having free energy of formation more negative than $CdCl_2$.

Since the reactions to produce $CdCl_2$ and the chlorinated metal are both exothermic, the rate of $Cl_2$ addition and metal addition have to be controlled. The cooling rate of the vessel should be designed to match the selected total heat production rate of $\leq 1$ KW, as is depicted in FIG. 1, this value was selected so as to maintain the temperature of the interior of the vessel and its contents at about 600° C.–700° C.

The porous basket 26 which receives the metal ingots to be chlorinated from the stationary chute 30 is rotated in the salt causing mixing which is necessary to scrub off the formed metal chloride and Cd, reaction products, from the metal surface. The metal chloride dissolves in the $CdCl_2$ or may form a separate phase or combine with the $CdCl_2$ depending on the particular metal chloride product. For valence 1, 2, 3 in the metal (M), the reaction with $CdCl_2$ is $(x)M+(y)CdCl_2 \rightarrow (x)MCl_{(2y/x)}+yCd$ with (x,y) being (2,1), (1,1), (2,3) respectively. At the reaction temperature, the metal feed is a solid. As its salt is formed by the reaction with $CdCl_2$, the metal product chloride dissolves (is liquified) in the liquid metal chloride—$CdCl_2$ mixture. This mixture grows richer in the metal chloride as the as the metal chloride dissolves until it is saturated. At saturation, a solid precipitate forms, the precipitated solid is either a metal chloride or a metal chloride—$CdCl_2$ compound. In any case the solid will remain with the salt phase since its density is considerably less than the Cd metal phase.

The other product of the reaction is Cd liquid metal which will be suspended as immiscible drops in the liquid salt, since the salt is under agitation from the rotation of the basket 26. When rotation ceases, the droplets settle out under gravitational force and recombine with the lower layer. The cadmium metal is substantially insoluble in the salt, $CdCl_2$ and is more dense causing the Cd to sink and recombine with the Cd layer positioned under the molten salt layer 14. The $Cl_2$ feed may be halted prior to consumption of all of the metal in the basket 26 in order to give a lower level of $CdCl_2$ in the product salt, metal chloride if desired.

After the reaction is complete, the salt layer consisting of the metal chloride, $CdCl_2$, possibly precipitated salt solids, and residual dissolved Cd is removed and the components are separated by distillation using the differences in boiling points, representative examples of which are set out in Table 1. The $CdCl_2$ and Cd distillate are recycled to the chlorinator.

TABLE 1

| G. | ° C. M.P. | ° C. B.P. | g/cm³ Density |
|---|---|---|---|
| LiCl | 605 | 1325 | 2.07 |
| NdCl₃ | 784 | 1600 | 4.13 |
| CdCl₂ | 568 | 960 | 4.05 |
| Cd | 321 | 765 | 8.64 |
| UCl₃ | 842 | 1410 | 5.5 |
| CeCl₃ | 842 | 1727 | 3.92 |
| LaCl₃ | 860 | 1000 | 3.84 |
| PuCl₃ | 760 | 1650 | 5.7 |
| YCl₃ | 721 | 1507 | 2.67 |
| BaCl₂ | 963 | 1560 | 3.9 |

The invention, as stated above is useful for chlorinating a wide variety of metals, the limiting factor being that the free energy of formation of the chloride of the selected metal be more negative than $CdCl_2$, otherwise the chlorination of the metal and reduction of the $CdCl_2$ will not be thermodynamically driven. Table 1 is representative only, all values being readily available to one of ordinary skill in the art. Although relative motion between the metal in the porous basket 26 and the salt 14 is shown as rotation of the basket, any mechanism known to those of ordinary skill may be used to provide relative movement between the salt 14 and the metal in the basket 26. The chlorination reactions will be exothermic as is the chlorination of Cd, so that a limiting factor is total heat removal rate from the system to maintain the reactants within a suitable temperature range, such as but not necessarily from about 600° C. to about 700° C. The heat removal (loss) rate from the chlorinator matches the heat input rate of the chlorination reactions.

For instance, it would be undesirable for the salt temperature to exceed the boiling point of Cd (765°), unless the system was pressurized, but these operational details are within the skill of the art. In addition, the BP boiling point, of the metal chloride should be greater than that of the $CdCl_2$ or Cd to allow for the separation of the metal chloride a distillation process.

While there has been disclosed what is considered to be the preferred embodiment of the present intention, it is understood that various changes in the details may be made without departing from the spirit, or sacrificing any of the advantages of the present invention.

The embodiments of the invention in which an exclusive property or: privileges is claimed are defined as follows:

1. A method of producing metal chlorides in a chlorinator vessel, comprising;

establishing an upper layer which is initially of liquid $CdCl_2$ on a lower liquid Cd layer, adding chlorine gas to said lower liquid Cd layer to form new liquid $CdCl_2$ where said newly formed liquid $CdCl_2$ has a lower density than liquid Cd and is essentially insoluble in liquid Cd, thus rises into the upper layer, submerging a porous basket agitator and a lower opening of a slug chute, which is positioned above said basket agitator, in said upper layer initially of $CdCl_2$, selecting a metal to form said metal chloride such that a free energy of formation of the metal chloride is more negative than that for $CdCl_2$ per chlorine atom and where a boiling point of said metal chloride is greater than that of $CdCl_2$ resulting in the metal chloride being less volatile than $CdCl_2$ or Cd, depositing said selected metal used to form said metal chloride through said slug chute into said basket agitator, contacting liquid $CdCl_2$ in the upper layer with said metal in a sufficient time to react said metal with the liquid $CdCl_2$ to form a metal chloride and Cd in the upper layer, coordinating a rate of chlorine addition with a rate of metal addition to control a combined exothermic reaction ensuing from the addition of $Cl_2$ to Cd and the formation of the metal chloride so that a temperature associated with said upper layer is in a range of 600° C. to 700° C., settling the formed Cd from the upper layer after the contacting step to recombine the formed Cd with the lower liquid Cd layer and removing the remaining upper layer from the chlorinator vessel, and employing a distillation process to separate the newly formed metal chloride from the removed upper layer.

2. The method of claim 1, wherein the metal to be reacted with $CdCl_2$ is an alkali metal, alkaline earth metal, rare earth metal, actinide metal or TRU metal.

3. The method of claim 1, wherein the chlorine gas is introduced entirely within the liquid Cd to ensure reaction of chlorine gas only with liquid Cd metal providing for no corrosion.

4. The method of claim 1, wherein heat is removed during the exothermic reaction of chlorine gas and the liquid Cd and the metal with $CdCl_2$ to maintain the temperature of the liquid Cd and the initial upper layer or the mixed upper layer substantially constant.

5. The method of claim 1, wherein relative movement is provided between the $CdCl_2$ and the metal in said basket agitator during said reaction to form the metal chloride.

6. The method of claim 1, wherein the chlorine is introduced into the liquid Cd metal through a quartz tube and the metal to be reacted is introduced through said slug chute which feeds the metal into said basket agitator which is rotated in the upper layer during the production of the metal chloride.

7. The method of claim 6, wherein the metal to be reacted is a rare earth metal, a TRU metal, an alkaline earth metal, or alkali metal.

8. A method of producing select metal chlorides in a chlorinator, comprising;

introducing chlorine gas into liquid Cd, establishing an upper layer which is initially liquid $CdCl_2$ and is positioned above and in contact with the liquid Cd where the Cl reacts with the Cd to replenish the $CdCl_2$ which is used to form the metal chloride, selecting metals for chlorination which have a free energy of formation of the chloride which is more negative than that for $CdCl_2$ and which have boiling points higher than a boiling point for $CdCl_2$ resulting in the metal chloride being less volatile than the $CdCl_2$ or the Cd, placing the metal or metals in a porous basket agitator and depositing said porous basket agitator in the upper layer where one or more of the selected metals which reacts with the $CdCl_2$ in said upper layer to form a metal chloride or chlorides producing a mixed upper layer, providing relative movement between $CdCl_2$ and the metal or metals to be reacted, removing said mixed upper layer from the chlorinator, and separating the metal chloride or chlorides formed from the $CdCl_2$ in the mixed upper layer by a distillation process.

9. The method of claim 8, wherein the metal reacts with the $CdCl_2$ for sufficient time to form a desired quantity of the metal chloride.

10. The method of claim 9, wherein the metal is a rare earth metal or a TRU metal.

11. The method of claim 10, wherein the chlorine is introduced into the liquid Cd metal through a quartz tube and the metal to be reacted is introduced into a porous basket agitator by means of a chute and the porous basket agitator is rotated in the liquid $CdCl_2$ upper layer to produce the metal chloride.

12. The method of claim 11, wherein the metal to be reacted is Nd.

* * * * *